United States Patent
Susko

(10) Patent No.: US 9,827,884 B2
(45) Date of Patent: Nov. 28, 2017

(54) SINGLE WIRE TORSION-LIMITING LOWER SEAT ANCHORAGE

(71) Applicant: Ford Global Technologies, LLC, Dearborn, MI (US)

(72) Inventor: Thomas J. Susko, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 14/844,148

(22) Filed: Sep. 3, 2015

(65) Prior Publication Data

US 2017/0066349 A1   Mar. 9, 2017

(51) Int. Cl.
*B60N 2/68* (2006.01)
*B60N 3/08* (2006.01)
*B60N 2/28* (2006.01)
*B60N 2/18* (2006.01)

(52) U.S. Cl.
CPC ............. *B60N 2/2893* (2013.01); *B60N 2/68* (2013.01); *B60N 2/1803* (2013.01); *B60N 2/682* (2013.01)

(58) Field of Classification Search
CPC ........ B60N 2/682; B60N 2/68; B60N 2/1803; B60N 2/165; B60N 2/2887; B60N 2/2893; B60N 3/08
See application file for complete search history.

(56) References Cited

U.S. PATENT DOCUMENTS

| | | | |
|---|---|---|---|
| 3,584,348 A * | 6/1971 | Soltysik | F16L 3/13 248/68.1 |
| 4,039,744 A * | 8/1977 | Seaquist | H01B 17/18 174/169 |
| 4,673,151 A * | 6/1987 | Pelz | F16L 3/1215 24/336 |
| 5,918,934 A | 7/1999 | Siegrist | |
| 5,979,980 A * | 11/1999 | Amorin | B60N 2/643 297/218.3 |
| 6,263,954 B1 * | 7/2001 | Nakayama | F28F 9/002 165/67 |
| 6,276,754 B1 * | 8/2001 | Youssef-Agha | B60N 2/28 24/682.1 |
| 6,279,798 B1 | 8/2001 | Partch et al. | |
| 6,361,115 B1 * | 3/2002 | Aufrere | B60N 2/2821 297/216.11 |
| 6,604,793 B2 | 8/2003 | Habedank | |
| 7,296,854 B2 | 11/2007 | Lentz | |

(Continued)

*Primary Examiner* — Phi A
(74) *Attorney, Agent, or Firm* — Vichit Chea; Price Heneveld LLP

(57) ABSTRACT

A vehicle includes a vehicle seat having a seat frame and a plurality of wire anchors attached to a lateral member of the seat frame. Each wire anchor is formed from a single continuous metallic wire and comprises an anchor portion, a first end that extends from the anchor portion and tangentially engages the lateral member proximate a top portion of the lateral member and extends downward over a rear portion of the lateral member and a second end that extends from the anchor portion and tangentially engages the lateral member proximate a bottom portion of the lateral member and extends upward over the rear portion of the lateral member, and wherein the wire anchor is free of engagement with a front portion of the lateral member.

12 Claims, 4 Drawing Sheets

(56) References Cited

U.S. PATENT DOCUMENTS

| | | | | |
|---|---|---|---|---|
| 7,832,248 B2 * | 11/2010 | Heath | ............... | F16L 3/1215 |
| | | | | 72/379.2 |
| 8,079,552 B2 * | 12/2011 | Sweigard | ............ | F16L 3/1233 |
| | | | | 24/336 |
| 2004/0080194 A1 | 4/2004 | Medvecky et al. | | |
| 2013/0313850 A1 | 11/2013 | Hawkins et al. | | |

\* cited by examiner

US 9,827,884 B2

SINGLE WIRE TORSION-LIMITING LOWER SEAT ANCHORAGE

FIELD OF THE INVENTION

The present invention generally relates to vehicle seating, and more specifically, lower anchorage members incorporated within the frames of vehicle seating.

BACKGROUND OF THE INVENTION

Various automobiles include lower anchorage members for attaching seating-type accessories including child seats, boosters, storage mechanisms, and other similar features. These lower anchorages are generally disposed between a seat cushion and a seat back, such that the anchorages are generally concealed when not in use, but accessible when needed. Typically, these anchorages are positioned in rear vehicle seating in second and third row vehicle seats.

SUMMARY OF THE INVENTION

According to one aspect of the present invention, a vehicle includes a vehicle seat having a seat frame and a plurality of wire anchors attached to a lateral member of the seat frame. Each wire anchor is formed from a single continuous metallic wire and comprises an anchor portion. A first end extends from the anchor portion and tangentially engages the lateral member proximate a top portion of the lateral member and extends downward over a rear portion of the lateral member. A second end extends from the anchor portion and tangentially engages the lateral member proximate a bottom portion of the lateral member and extends upward over the rear portion of the lateral member wherein the wire anchor is free of engagement with a front portion of the lateral member.

According to another aspect of the present invention, a vehicle seat includes first and second ends of a wire anchor that extend over and under a frame member, respectively, wherein the first and second ends are spaced apart and engage a rear portion of the frame member. A central latch portion of the wire anchor is spaced from a front lateral portion of the frame member, wherein the wire anchor is free of contact with the front lateral portion.

According to another aspect of the present invention, a vehicle seat frame includes a lateral member and a wire anchor having opposing ends that wrap over and under the lateral member and engage a rear portion of the lateral member. A central anchor portion of the wire anchor is positioned between the opposing ends and extends away from a front portion of the lateral member, wherein the wire anchor is free of contact with the front portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
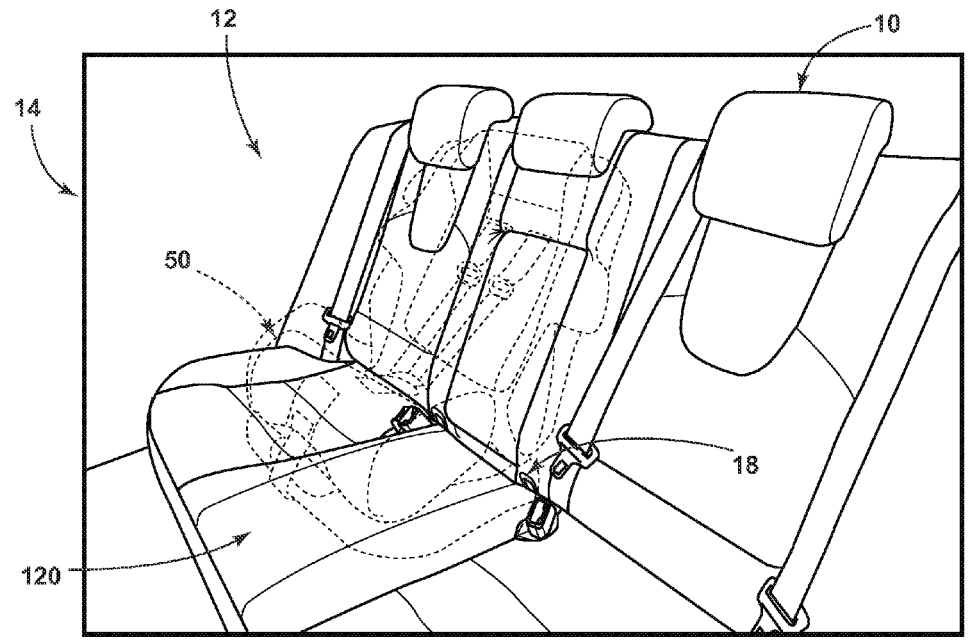
FIG. 1 is a side perspective view of a rear seat of a vehicle incorporating an aspect of the torsion-limiting single wire anchor.
Figure 2:
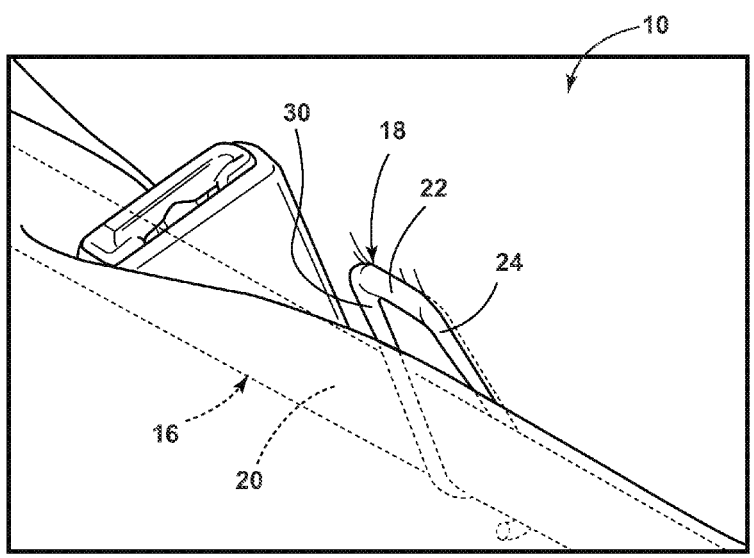
FIG. 2 is an enlarged perspective view of the vehicle seat of FIG. 1.
Figure 3:
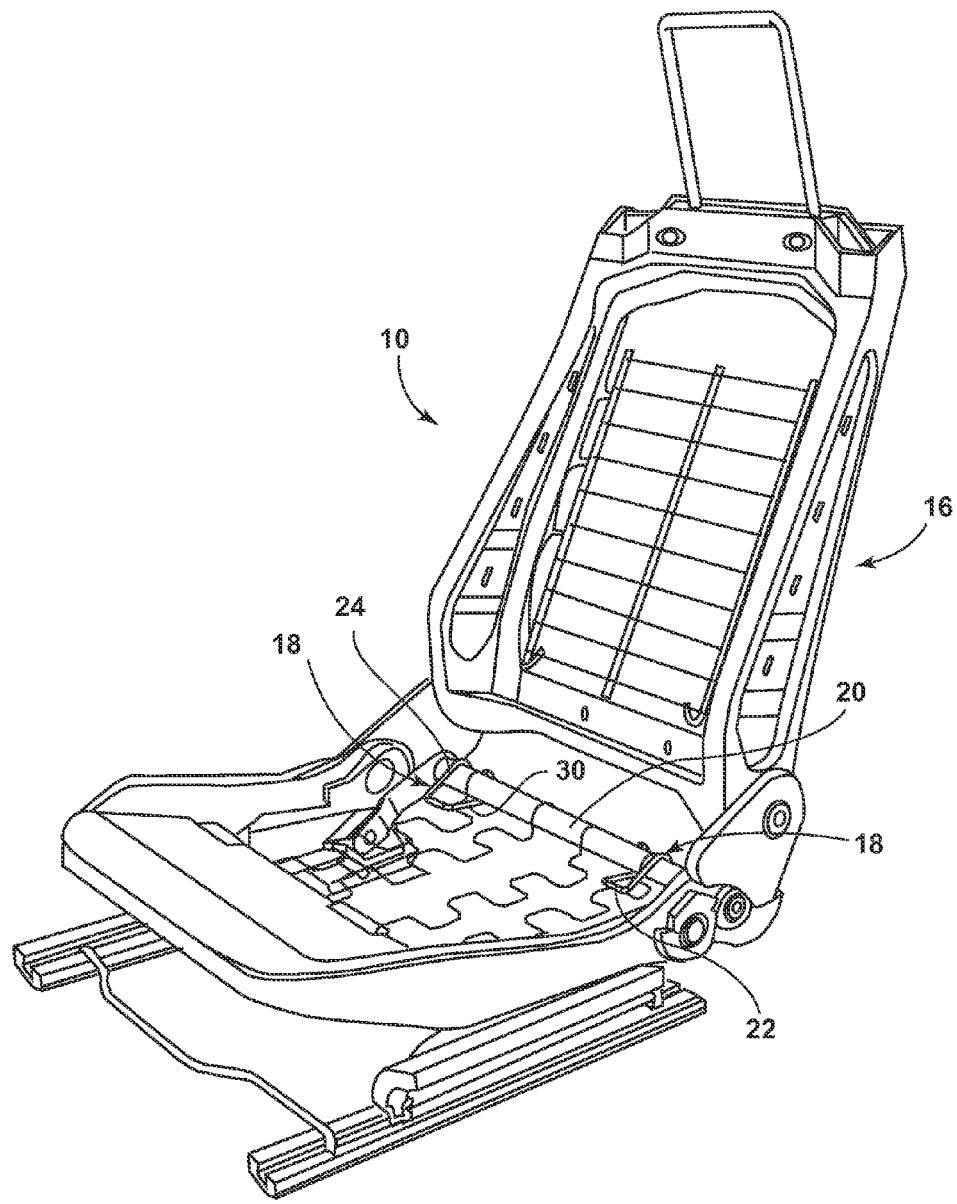
FIG. 3 is a frame for a vehicle seat incorporating an aspect of the torsion-limiting single wire anchor.
Figure 4:
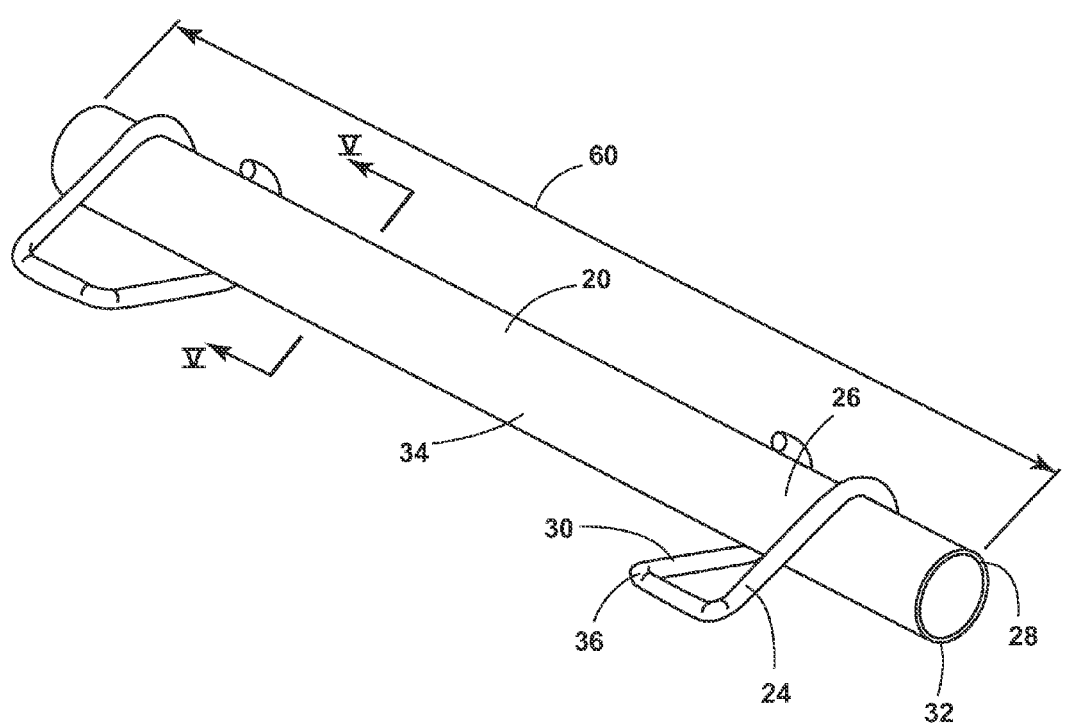
FIG. 4 is a top perspective view of a lateral member of a vehicle seat frame having two torsion-limiting single wire anchors attached thereto.
Figure 5:
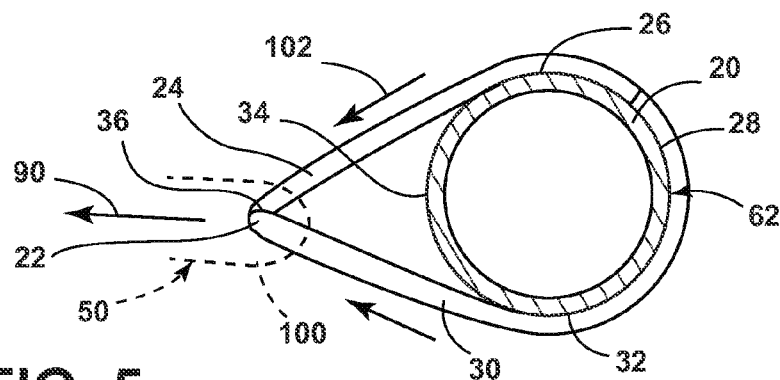
FIG. 5 is a cross-sectional view of the lateral member of FIG. 4 taken along line V-V.
Figure 6:
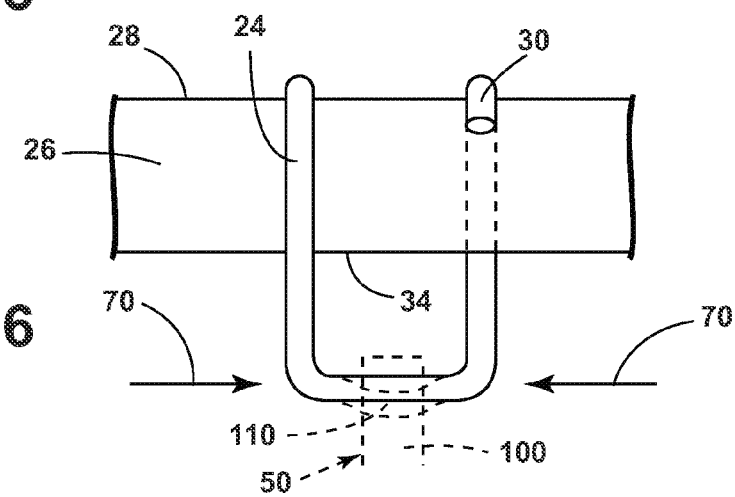
FIG. 6 is a top plan view of the lateral member of FIG. 4 illustrating one of the torsion-limiting single wire anchors.
Figure 7:
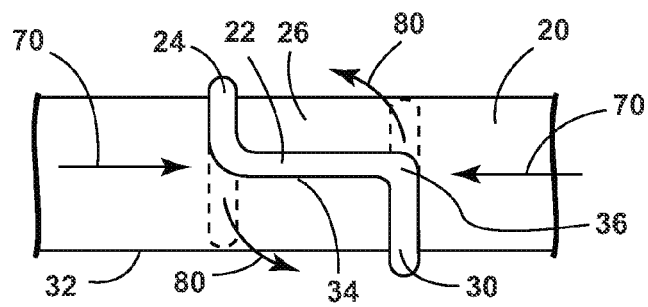
FIG. 7 is a front elevational view of the lateral member of FIG. 4 illustrating one of the torsion-limiting single wire anchors.
Figure 8:
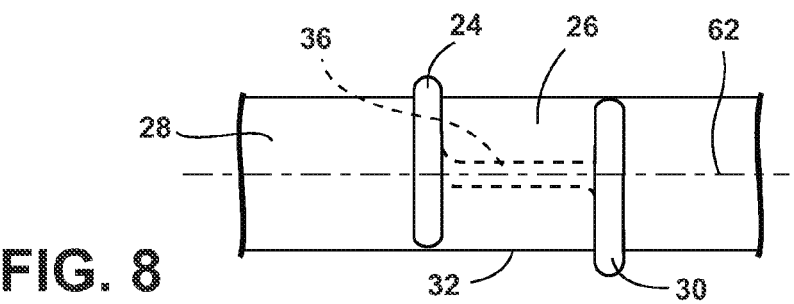
FIG. 8 is a rear elevational view of the lateral member of FIG. 7.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5, reference numeral 10 generally refers to a seat disposed within a passenger compartment 12 of a vehicle 14, according to at least one embodiment. The vehicle 14 can include the vehicle seat 10 having a seat frame 16. A plurality of torsion-limiting single wire anchors 18 are attached to a lateral member 20 of the seat frame 16, where each torsion-limiting single wire anchor 18 is formed from a single continuous metallic wire. Each of the torsion-limiting single wire anchors 18 includes an anchor portion 22 and a first end 24 that extends from the anchor portion 22 and tangentially engages the lateral member 20 proximate a top portion 26 of the lateral member 20 and extends downward over a rear portion 28 of the lateral member 20. A second end 30 extends from the anchor portion 22 and tangentially engages the lateral member 20 proximate a bottom portion 32 of the lateral member 20 and extends upward and over the rear portion 28 of the lateral member 20. It is contemplated that the torsion-limiting single wire anchor 18 is free of engagement with a front portion 34 of the lateral member 20. It is also contemplated that the first and second ends 24, 30 extend from respective latch ends 36 of the anchor portion 22.

Referring again to FIGS. 1-5, the torsion-limiting single wire anchors 18 of the vehicle seat 10 are typically installed within seat frames 16 positioned behind front row seating (not shown) for the vehicle 14. As such, the torsion-limiting single wire anchors 18 are typically installed in rear seating, such as second and third rows within various vehicles 14. It is contemplated that the torsion-limiting single wire anchors 18 can be installed within front row seating of a vehicle 14. The torsion-limiting single wire anchors 18 are engaged to a lateral member 20 of the seat frame 16 to allow for access by users of the vehicle 14 to latch certain seating-type accessories 50 to the vehicle seat 10. Such accessories can include, but are not limited to, child seats, booster seats, storage accessories and other seating-type accessories 50 that are installed upon vehicle seats 10 to provide for specialized seating or particular storage solutions.

Referring again to FIGS. 4 and 5, the first and second ends 24, 30 of the torsion-limiting single wire anchors 18 can be configured to be parallel or substantially parallel to one another.

Additionally, the first and second ends 24, 30 that extend from the anchor portion 22 are typically in a spaced configuration such that each of the first and second ends 24, 30 engages the lateral member 20 at different portions along a length 60 of the lateral member 20 of the seat frame 16. In this manner, the first and second ends 24, 30 extend around opposing sides of the lateral member 20, above and below, respectively, and extend across a lateral axis 62 of the rear portion 28 from above and below the lateral member 20. In this manner, the torsion-limiting single wire anchor 18 substantially encircles or fully encircles the lateral member 20 of the seat frame 16 to provide a sufficient surface-to-surface contact between the torsion-limiting single wire anchor 18 and the lateral member 20. This configuration provides a large amount of surface contact through which the torsion-limiting single wire anchor 18 can be welded to the lateral member 20. Accordingly, each of the torsion-limiting single wire anchors 18 can provide a sturdy connection point to which the various seating-type accessories 50 can be attached.

According to the various embodiments, as exemplified in FIGS. 2-8, the tangential engagement between the first and second ends 24, 30 and the lateral member 20 of the seat frame 16 is typically provided where the lateral member 20 is a tubular member having a generally rounded cross-sectional profile. According to various alternate embodiments, the lateral member 20 can be configured into different cross-sectional shapes that can include, but are not limited to, rectilinear, channel-shaped, irregularly shaped, arcuate, linear, combinations thereof, and other configurations that can provide an anchorage point to which these torsion-limiting single wire anchors 18 can be connected. Regardless of the cross-sectional profile of the lateral member 20, the first and second ends 24, 30 of the torsion-limiting single wire anchor 18 are configured to wrap above and below the lateral member 20 in order to substantially encircle or fully encircle the lateral member 20.

According to the various embodiments, as exemplified in FIGS. 1-8, the torsion-limiting single wire anchor 18 having the first and second ends 24, 30 that wrap over and under the lateral member 20, is configured to significantly oppose lateral forces 70 that may be exerted upon the torsion-limiting single wire anchor 18. Lateral forces 70 in either direction can be opposed by either the first or second ends 24, 30, or both, through their cooperative and simultaneous engagement with the rear portion 28 of the lateral member 20. Where a lateral force is exerted upon the torsion-limiting single wire anchor 18 from a left hand side, one of the first and second ends 24, 30 positioned opposite the direction of the lateral force 70 includes enough leverage through the engagement between the torsion-limiting single wire anchor 18 and the rear portion 28 of the lateral member 20 to oppose the exerted lateral force 70. The opposition of the lateral force 70 substantially prevents twisting, flexion, or other displacement or deflection of the torsion-limiting single wire anchor 18 during use with a seating-type accessory.

Conventional anchors for conventional vehicle seats 10 can sometimes experience lifting, twisting, and other deflection resulting from lateral forces 70 being exerted upon the conventional anchors from the left or right sides. These conventional anchors are less able to oppose the moment forces 80 that can be produced by exerted lateral forces 70 being placed upon the conventional anchors.

Conversely, according to the various aspects of the torsion-limiting single wire anchor 18, the cooperative and simultaneous engagement of the first and second ends 24, 30 with the rear portion 28 of the lateral member 20, where the first and second ends 24, 30 overlap the rear portion 28 of the lateral member 20, provides sufficient structural engagement between the torsion-limiting single wire anchor 18 and the lateral member 20 to oppose the lateral forces 70 and the resulting moment forces 80 that may be exerted upon the torsion-limiting single wire anchor 18.

Referring again to FIGS. 4-8, due to the tangential or substantially tangential engagement between the first and second ends 24, 30 and the lateral member 20, pulling forces 90 exerted upon the torsion-limiting single wire anchor 18 can be directed axially through the first and second ends 24, 30 and to the anchor portion 22. In this manner, as a pulling force 90 or lateral force 70 is exerted upon the torsion-limiting single wire anchor 18, pulling force 90 or lateral lifting and various moment forces 80 being exerted upon the torsion-limiting single wire anchor 18 can be substantially prevented due to the tangential configuration of the first and second ends 24, 30. Additionally, pulling forces 90 exerted upon at the anchor portion 22 by accessory latches 100 or clasps of the seating-type accessories 50, can also be directed through the first and second ends 24, 30 along an axial direction 102 of the first and second ends 24, 30 and to the anchor portion 22. As such, the tangential configuration of the engagement between first and second ends 24, 30 and the lateral member 20 substantially limits the ability of the torsion-limiting single wire anchor 18 to bend, flex, twist, or otherwise deform. Additionally, the tangential configuration limits the amount of angle intersections in the torsion-limiting single wire anchor 18. Such angle intersections, particularly in the first and second ends 24, 30, can result in forces exerted upon the torsion-limiting single wire anchor 18 to cause deflection at these angle intersections by the linear forces traveling through the angle intersections and not axially along the first and second ends 24, 30.

According to various aspects of the torsion-limiting single wire anchor 18, as exemplified in FIGS. 3-8, the vehicle seat 10 can include first and second ends 24, 30 of a wire anchor 18 that extend over and under a seat frame 16 member, such as the lateral member 20, of the vehicle seat 10, respectively. In this manner, the first and second ends 24, 30 are spaced apart and engaged in a rear portion 28 of the lateral member 20. A central latch portion, or anchor portion 22, of the wire anchor 18 is spaced from a lateral front portion 34 of the lateral member 20, wherein the wire anchor 18 is free of contact with the lateral front portion 34. It is contemplated that the lateral member 20 can be a tubular member of the vehicle seat 10 that extends laterally from a left side of the seat frame 16 to a right side of the seat frame 16. It is also contemplated that the lateral member 20 can be other various structural portions of the seat frame 16 that extend between the left and right sides of the seat frame 16. It is further contemplated that the lateral member 20 or the seat frame 16 can be any one of various shapes including cylindrical, rectilinear, prismatic, irregular, arcuate, and other similar shapes.

Referring again to the various aspects of the device as exemplified in FIGS. 3-8, the torsion-limiting single wire anchor 18 can include first and second ends 24, 30 to wrap over and under, respectively, the lateral member 20, such that the first and second ends 24, 30 are in continuous contact with a rear portion 28 of the lateral member 20.

Additionally, it is contemplated that the central anchor or latch of the torsion-limiting single wire anchor 18 can extend linearly between the first and second ends 24, 30. According to the various embodiments, it is contemplated that the central anchor, or the anchor portion 22, can be any one of various shapes that can include, but are not limited to, linear, arcuate, angular, rectilinear, pointed, irregular, combinations thereof, and other similar configurations. It is also contemplated that the anchor portion 22 can include a notch 110 along the length 60 of the anchor portion 22 that can be adapted to receive and position the accessing latch of the seating-type accessory within a specific region or area of the anchor portion 22. Such a notch 110 can be configured to prevent the lateral movement of the accessory latch 100 of the seat-type accessory during use.

According to the various embodiments, each seat frame 16 can include one or more of the torsion-limiting single wire anchors 18. Typically, each seating position 120 within the passenger cabin of the vehicle 14 can include a pair of torsion-limiting single wire anchors 18 that are positioned outwardly within a seat frame 16 to be toward the left and right sides of each seating position 120. Other configurations of the torsion-limiting single wire anchor 18 that are contemplated for each seating position 120 can include one, two, three or more individual torsion-limiting single wire anchors 18.

According to the various embodiments, it is contemplated that each torsion-limiting single wire anchor 18 can be welded to the frame member such as the lateral member 20, of the seat frame 16. Other connection methods are contemplated where such connection methods can include, but are not limited to, adhesives, mechanical connections, fasteners, tabs, hasps, clasps, and other similar mechanical connection methods. While a weld-type connection is preferred, these other mechanical and adhesive-type connections can be implemented in various conditions.

Referring again to FIGS. 3-8, the seat frame 16 of the vehicle 14 can include a lateral member 20 and a wire anchor 18 having opposing ends, corresponding to the first and second ends 24, 30, that wrap over and under the lateral member 20 and engage a rear portion 28 of the lateral member 20. A central anchor portion 22 can be positioned between the opposing first and second ends 24, 30, where the central anchor portion 22 extends away from a front portion 34 of the lateral member 20. It is contemplated that the wire anchor 18 can be free of contact with the front portion 34 of the lateral member 20.

According to the various embodiments, the torsion-limiting single wire anchor 18 being free of contact with the front portion 34 can be the result of a tangential connection between the first and second ends 24, 30 and the top and bottom portions 26, 32, respectively, with the lateral member 20. Because the first and second ends 24, 30 extend tangentially from the lateral member 20 and extend toward the anchor portion 22, the result is that no portion of the torsion-limiting single wire anchor 18 engages the front portion 34 of the lateral member 20. As discussed above, this configuration helps to ensure that forces exerted upon the torsion-limiting single wire anchor 18 are directed from the anchor portion 22 to the lateral member 20 in an axial direction 102 through the first and second ends 24, 30. This configuration can substantially limit the amount of moment forces 80 and torque that is exerted upon the torsion-limiting single wire anchor 18 and also limits stretching of the first and second ends 24, 30 such that the anchor portion 22 is not pulled away from the lateral member 20.

It is also contemplated that the first and second ends 24, 30, each wrapping across the rear portion 28 of the lateral member 20, provides additional structural integrity for the torsion-limiting single wire anchor 18 and also provides further structural support that can oppose the twisting, moment and other lateral forces 70 that may be exerted upon the torsion-limiting single wire anchor 18. As discussed above, the first end 24 of the torsion-limiting single wire anchor 18 can be in continuous contact with a top portion 26 of the lateral member 20 and also the rear portion 28 of the lateral member 20 such that the first end 24 extends toward the bottom portion 32 of the lateral member 20.

According to various embodiments, the first end 24 can be configured to extend beyond the rear portion 28 of the lateral member 20 and extend toward the bottom portion 32, such that the first end 24 may engage up to 180° or more of the surface around the lateral member 20. Similarly, the second end 30 of the torsion-limiting single wire anchor 18 can be in continuous contact with a bottom portion 32 of the lateral member 20 as well as the rear portion 28 of the lateral member 20. As discussed above, it is contemplated that the second end 30 can extend beyond the rear portion 28 of the lateral member 20 and extend toward or through at least part of the top portion 26 of the lateral member 20, such that the second end 30 can engage up to and exceeding 180° around the surface of the lateral member 20. In such an embodiment, it is contemplated that each of the first and second ends 24, 30 can be in simultaneous and continuous contact with at least 180° of the lateral member 20 or more. According to various alternate embodiments, it is contemplated that each of the first and second ends 24, 30 can be in continuous contact with less than 180° of the lateral member 20. The exact configuration of the first and second ends 24, 30 can depend on various factors that can include, but are not limited to, the type of vehicle 14, the type of seating-type accessories 50 that may be installed in the vehicle 14, the number of torsion-limiting single wire anchors 18 located within each seating position 120, the material of the torsion-limiting single wire anchor 18, and other factors.

According to the various embodiments, it is contemplated that the torsion-limiting single wire anchor 18 can be made of various materials that can include, but are not limited to, steel, aluminum, steel alloys, aluminum alloys, other types of metals, metal alloys, plastic, rubber, composite, polymers, combinations thereof, and other similar substantially rigid materials that can withstand lateral and axial forces that may be exerted upon the torsion-limiting single wire anchor 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
 a vehicle seat having a seat frame;
 a plurality of wire anchors attached to a lateral member of the seat frame, each wire anchor being formed from a single continuous metallic wire and comprising:
  an anchor portion;
  a first end that linearly and directly extends from the anchor portion to a top portion of the lateral member and tangentially engages the lateral member proximate the top portion, wherein the first end extends downward over a rear portion of the lateral member; and a second end that linearly and directly extends from the anchor portion to a bottom portion of the lateral member and tangentially engages the lateral member proximate the bottom portion, wherein the second end extends upward over the rear portion of the lateral member, and wherein the wire anchor is free of engagement with a front portion of the lateral member, the front portion being diametrically opposed to the rear portion.

2. The vehicle of claim 1, wherein the first and second ends extend from respective latch ends of the anchor portion.

3. The vehicle of claim 1, wherein the first and second ends are substantially parallel and are disposed in a spaced configuration at the rear portion.

4. The vehicle of claim 1, wherein each of the first and second ends extend across a lateral axis of the rear portion from above and below, respectively.

5. A vehicle seat comprising:
   first and second ends of a wire anchor that are spaced apart and extend linearly to top and bottom portions, respectively, of a frame member, each engaging rear portion of the frame member that is diametrically opposed to a front portion thereof; and
   a central latch portion of the wire anchor that, with the first and second ends, is spaced from and free of contact with the front portion.

6. The vehicle seat of claim 5, wherein the frame member is a tubular member of a vehicle seat frame.

7. The vehicle seat of claim 6, wherein the frame member is cylindrical.

8. The vehicle seat of claim 5, wherein the first and second ends wrap over and under, respectively, and wherein the first and second ends are in continuous contact with the rear portion.

9. The vehicle seat of claim 5, wherein the central latch portion extends linearly between the first and second ends.

10. The vehicle seat of claim 5, wherein the central latch portion is generally perpendicular to each of the first and second ends.

11. The vehicle seat of claim 5, wherein the frame member includes a plurality of wire anchors.

12. The vehicle seat of claim 5, wherein the first and second ends extend tangentially from the frame member toward respective latch ends of the central latch portion.

* * * * *